(Model.)
J. H. MITCHELL.
CAKE AND CONFECTIONERY MACHINE.
No. 291,381. Patented Jan. 1, 1884.
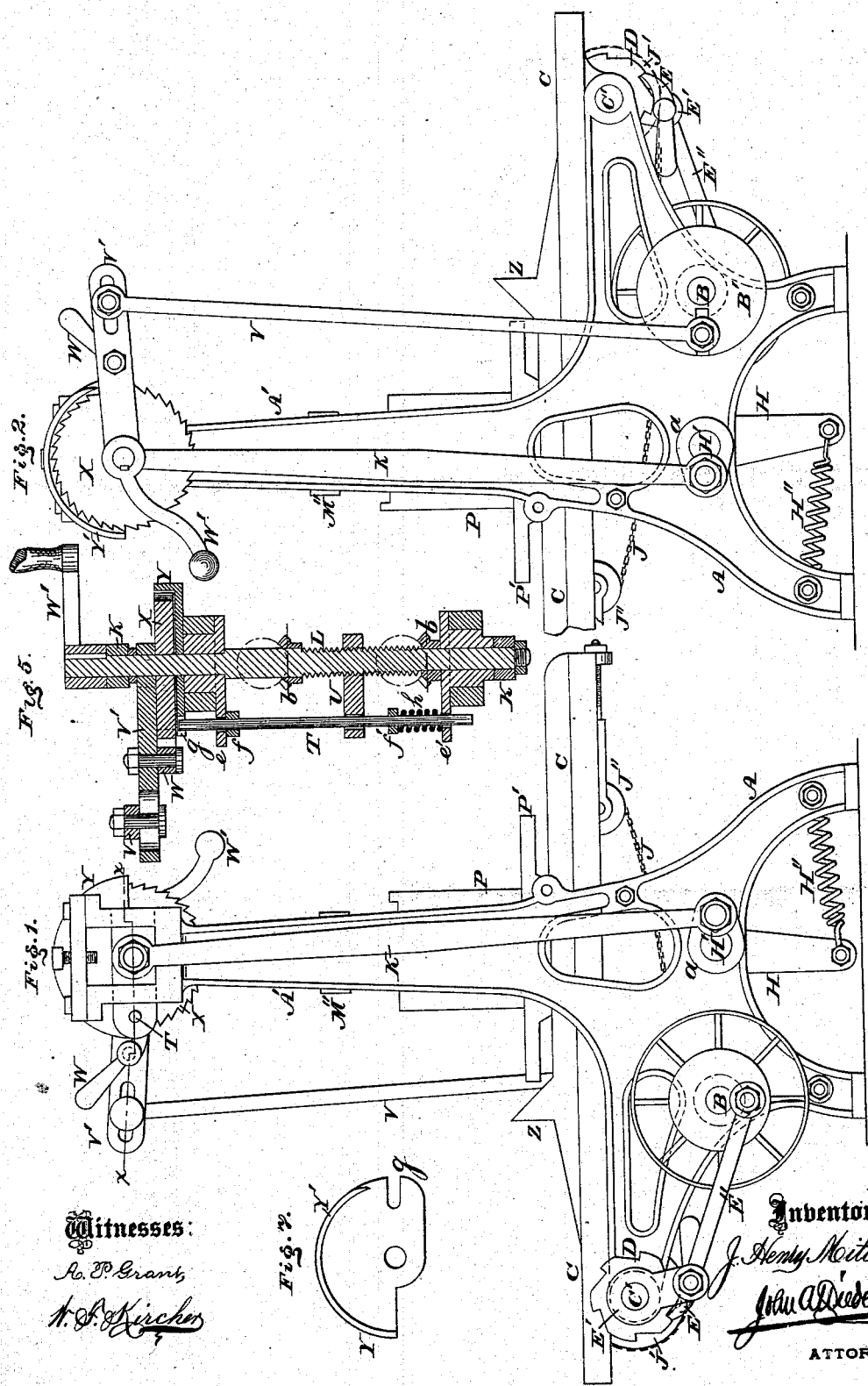
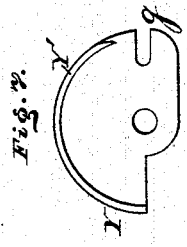
Witnesses:
A. P. Grant
W. P. Kircher
Inventor:
J. Henry Mitchell
John A. Diedersheim
ATTORNEY.

(Model.) 2 Sheets—Sheet 2.
J. H. MITCHELL.
CAKE AND CONFECTIONERY MACHINE.
No. 291,381. Patented Jan. 1, 1884.
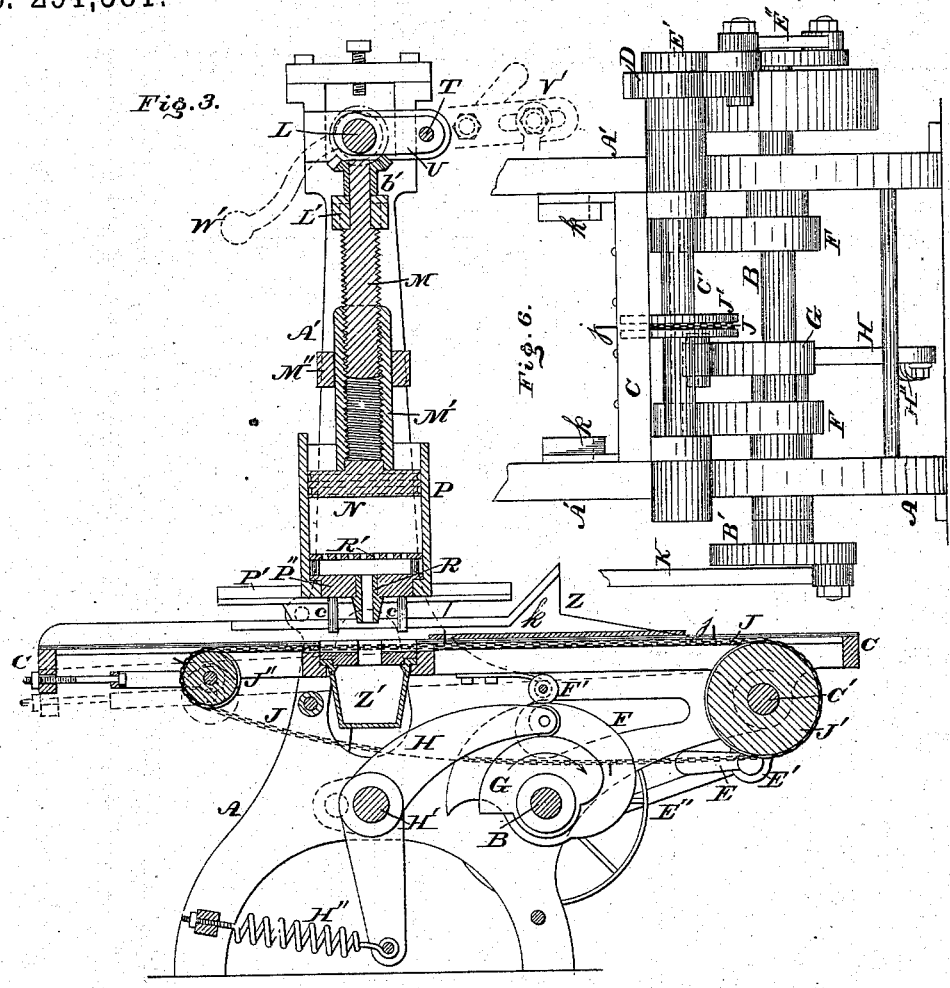
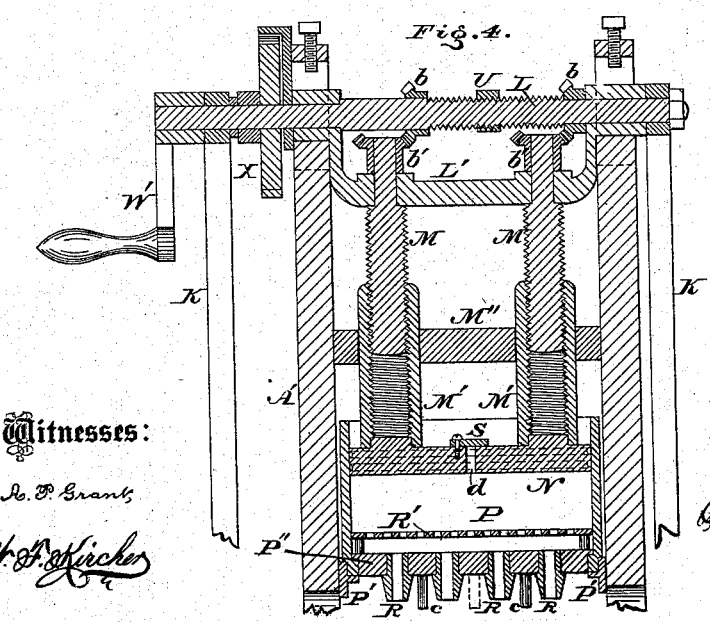
Witnesses:
R. P. Grant,
W. F. Kircher
Inventor:
J. Henry Mitchell,
John W. Gebersheim,
ATTORNEY.

UNITED STATES PATENT OFFICE.

J. HENRY MITCHELL, OF PHILADELPHIA, PENNSYLVANIA.

CAKE AND CONFECTIONERY MACHINE.

SPECIFICATION forming part of Letters Patent No. 291,381, dated January 1, 1884.

Application filed December 15, 1880. (Model.)

*To all whom it may concern:*

Be it known that I, J. HENRY MITCHELL, a citizen of the United States, residing in the city and county of Philadelphia, and State of Pennsylvania, have invented a new and useful Improvement in Cake and Confectionery Machines, which improvement is fully set forth in the following specification and accompanying drawings, in which—

Figures 1 and 2 are views of opposite sides of the machine embodying my invention. Fig. 3 is a central longitudinal vertical section thereof. Fig. 4 is a transverse section of a portion thereof. Fig. 5 is a horizontal section in line *x x*, Fig. 1. Fig. 6 is an end view of a portion thereof. Fig. 7 is a side elevation of a detached portion.

Similar letters of reference indicate corresponding parts in the several figures.

My invention consists of the combination, in an organized cake or candy machine, of a material-box, a pan-supporting table, an endless conveyer and its drums or pulleys, and a positively-operated ratchet-wheel having differential teeth, the conveyer thus having imparted to it intermittent motions of different lengths.

The invention also consists of the combination, in a cake and candy machine, of a dough or material box having a piston, a rising and falling head, and advancing mechanism whereby said piston is advanced into and returned from the material-box and additionally advanced on the return, and alternately ejects and stops the flow of the material.

The invention also consists of the material-box having discharge nozzles or outlets at the bottom and open at top, in combination with the forcing-piston having an air-vent and valve.

The invention also consists of the material-box having at its bottom discharge-nozzles and pendent stops which are longer than said nozzles.

The invention also consists of a scrap-receiving box having a perforated lid, which sustains the pans during the deposit of the material and permits scraps to fall into the box.

The invention also consists of certain parts, constructed and combined as hereinafter stated, whereby the piston of the material-box is automatically stopped when it has descended to its full extent.

Referring to the drawings, A represents the frame of the machine, and B the driving-shaft, suitably mounted thereon.

C represents a swinging table, which is mounted at one end on a shaft, C', which, having its bearings on the frame A, carries a ratchet, D, with which engages a pawl, E, hung on an arm, E', loosely fitted to the shaft C, said arm receiving motion from the shaft B by means of a connecting-rod, E''.

Fixed to the shaft B are cams F, which are adapted to bear against rollers F', journaled to the table C, and by rotation to elevate the table at intervals. To said shaft B is also connected a cam, G, adapted to bear against one end of an angular or rocking arm, H, which is secured to a shaft, H', mounted on the frame A, the other end of the arm having attached to it a spring, H'', one end whereof is connected to the frame A.

J represents an endless chain, which is passed around a pulley, J', connected to the shaft C', and a pulley, J'', mounted on the end of the table opposite to said shaft C'.

To opposite ends of the shaft H' are cranks *a*, to which are secured upright connecting-rods K, the upper ends of which are hung loosely on a horizontal shaft, L, which is mounted on a vertically-sliding head, L', located at the upper portion, A', of the frame A, and guided thereon.

Connected to the shaft L are bevel-wheels *b b*, which gear with bevel-wheels *b' b'*, each of which is fixed to a screw-shaft, M, fitted to an internally-threaded cylinder, M', the lower end of which is rigidly secured to the piston N, consisting of a horizontally-arranged head or plate which is fitted to the dough or material receiving box P of the machine, said box being freely supported on longitudinal guides P', whereby it may be displaced and removed, when required, by sliding it on the guides clear thereof, it being noticed that the cylinders M' are guided and retained in position by a cross-piece, M'', attached to the upper portion, A', of the frame A, that the cylinders M', vertical screw-shafts M, and horizontal screw-shaft L and gearing *b b'* move together as one with the head L', and that the box P overhangs the table C and chain J.

One side of the material-box is higher than the other, to form a shoulder, P'''. When the piston is raised to permit the removal of the box, the bottom of said piston is just above the upper edge of the lower side of the box. The box may then be run back, filled, and returned, and when returned the shoulder P''' abuts against the piston as a stop, whereby the box is located true in position, and the piston is adapted readily to enter the box without striking the top edges thereof.

The base P'' of the box P is provided with nozzles R, and made removable from the box, so that nozzles of various designs may be employed and applied to the box for making drops, scrolls, jumbles, lady-fingers, and other cakes and candy, and in the box, above the base, is supported a horizontal reticulated plate, R', forming, in a measure, a false bottom of the box. The base of the box has depending from it stops $c$, which, being longer than the nozzles R, limit the upward motion of the table C and bake-pans resting upon it, and the piston N has an air-vent, $d$, the closing of which is occasioned by a valve, S.

It will be noticed that the nozzles R are not designed to touch the bake-pan at any time, for the pan is held by the long stops $c$, which press it firmly and flat on the table, and the nozzles are always elevated above the pan, so that the dough or material may flow from the nozzles in streams, which are deposited on the pan and broken in a manner hereinafter stated.

Referring to Fig. 5, T represents a sliding rod, which extends parallel with the shaft L, and is mounted on arms $e$ $e'$, projecting from the head L', it being provided with stops $f$ $f'$, the stop $f$ abutting against the arm $e$, and the stop $f'$ adapted to be engaged by a sliding nut, U, which is loosely fitted on said rod T, and engagingly fitted on the screw-shaft L, so as to be moved backward and forward in the transverse direction by the rotations of said screw-shaft.

Connected to a crank, B', on the end of the shaft B is an arm, V, which is pivoted to a pawl-carrying arm, V', mounted loosely on the end of the screw-shaft L, the pawl W of said arm engaging with a ratchet, X, which is keyed or otherwise rigidly connected to the screw-shaft L. Fitted on the unthreaded part of said shaft L, and located between the ratchet X and top of the portion A' of the frame, is a throw-off, Y, consisting of a disk which rotates by friction with the shaft, and is formed with a flange, Y', which encircles a portion of the circumference of the ratchet X and top thereof. In the edge of the disk of the throw-off is a notch, $g$, into which the end of the rod T is adapted to enter, it being pressed thereinto at certain times by a coiled spring, $h$, which bears against the arm $e'$ and the stop or abutment $f'$.

The endless-chain carriage or conveyer J is provided with upright studs or pins $j$, which enter openings in the pans, and the sides of the conveyer are grooved, as at $k$, for the side edges of the pan, the beginning of the grooves being flaring, as at Z. The number of inches in the length of the pan or circumference of the wheel J' is a multiple of the number or difference of teeth upon the ratchet D. For example, if the length of the pans and circumference of the chain-wheel J' is thirty-six inches and the number of teeth in the ratchet-wheel D be six, the motion of the ratchet-wheel will represent six inches of motion of the pans, and six motions one entire revolution of the chain-wheel and a length of one pan. The position of the teeth upon the ratchet is as follows: The first five are five and three-fourths inches apart, and the last or sixth is seven and one-fourth inches from the fifth—total, thirty-six inches. This arrangement will make the last motion of the pan as it passes out from under the nozzle one and a half inch greater than the others. This increased motion will carry it clear of the space between the pans and their edges.

In the center of the frame A is a scrap-box, Z', which is suspended from transversely-extending ledges on said frame, whereby the box may be moved laterally and displaced when required. The lid or top of the scrap-box is perforated, to permit the scraps to fall into the box; but said lid, being strong, furthermore serves the important purpose of sustaining the pan while the deposit is being made, as the lid is directly below the nozzles and forms a continuous surface with the top of the table.

The dough or other material is placed in the box P and the screw-shaft L rotated by the hand-crank W', so that the piston N is lowered upon the material, the air-vent $d$ being opened by removing the valve S or plug, if employed, in order to permit the escape of air. When the material appears in said vent, the valve is closed. Power is applied to the driving-shaft B and the machine permitted to run at first to allow it to act uniformly upon the material in the box, the scrap-box Z' catching all the waste from the nozzle. The rotation of the shaft B causes the cams F to elevate the table C, the ratchet D to impart intermittent motions to the conveyer J, and the cam G, operating against the rocking arm, to cause the descent of the head L' and connected piston N, the latter exerting a downward pressure on the material in the box P. The arm V is raised by the rotation of the shaft B, and causes the pawl W to ride freely over the teeth of the ratchet X. The cam G clears the arm H, and the spring H'' restores said arm to its normal position and quickly elevates the head L' and connected parts. The cams F clear the rollers F', and the table C drops. The descent of the arm V causes the engagement of the pawl W with one of the teeth of the ratchet X, and the consequent rotation of the screw-shaft L, whereby the gear-wheels $b$ are rotated, and by means of the gear-wheels $b'$ the screw-shafts M are rotated, the effect whereof is to advance the piston a relative distance deeper into the box against the material therein. When the piston has advanced to full extent by the screw-shafts M, the nut U reaches and bears against the stop $f'$, and forces the end of the rod T from the notch $g$ of the throw-off Y. The latter, thus being uncontrolled by said rod, rotates, and its flange Y' presses against the nose or point of the pawl W and forces it from the ratchet X, whereby the shaft L, and consequently the shafts M, are relieved of motion. Then, by rotating the shaft L by means of the crank W', in opposite direction to that it acquired by the ratchet and pawl X W, the piston may be elevated to full extent clear of the box P. When the rotation of the shaft is reversed, the nut U leaves the stop $f'$, the spring $h$ forces the rod T toward the throw-off Y, and as the latter rotates by friction with the shaft L it leaves the pawl W, so that the latter again engages with the ratchet X, and the notch $g$ is permitted to receive the rod T, whereby the throw-off is again inoperative.

After the machine is fairly started, the pans are entered one after another, and when under the nozzle-plate the following action occurs: The piston descends and then remains at rest or dwells for a short time, after which it suddenly returns, thus stopping the flow and causing a slight back action and suction. At this moment the pan drops with the table and breaks the connection of the stream of material with the nozzles, this being assisted by said back action or suction. In the manufacture of soft cakes this feature of breakage readily occurs, as the dough by its sticky nature readily adheres to the pan. The next motion of the machine is to pull the pan along for another deposit, and when accomplished the pan and table start upward toward the nozzles, and the pan is clamped between the table and the pendants of the box, flattening it to receive the cakes or shapes, which are then ejected, as before, until the pan passes out of the other end filled uniformly with cakes, &c., of the design shaped by the nozzles. When the box is empty, the feed through the nozzles is stopped, and the piston will be raised in order to replenish the box, after which the other operations are repeated. The stroke of the pawl-carrying arm V' may be varied, owing to the adjustable connection of the arm V with said arm, and thus the action of the piston may be adjusted so as to press more or less on the material, whereby the cakes, &c., may be made larger or smaller, as desired. As the pans pass along, the studs or pins $j$ on the conveyer J emerge from the openings in the pans when the latter approach the end of the table, which lowers as it passes around the wheel J''. The tightening or tension of the conveyer is accomplished by means of a screw attached to the yoke or arm to which the axis or pivot-pin of the wheel J'' is connected.

The reticulated plate has its perforations smaller than the nozzles R, the object whereof is, first, to sustain the material while the box is being filled, and afterward prevent the clogging of the nozzles with lumps of dough, &c.

The strainer is movable and removable, and rises and falls freely with the action of the piston upon the material in the box.

The piston has its sides horizontally grooved, so that as it descends into the box some of the dough or material oozes between the piston and box and fills the grooves, thus making a plastic joint and preventing further escape of the material.

Having thus described my invention, what I claim as new, and desire to secure by Letters Patent, is—

1. In an organized cake or candy machine, the combination of a material-box, a pan-supporting table, an endless conveyer and its drums or pulleys, and a positively-operated ratchet-wheel having differential teeth, substantially as and for the purpose set forth.

2. In an organized cake and candy machine, the combination, with a dough or material box and the piston thereof, of a rising and falling head and advancing mechanism, substantially as described, whereby said piston is advanced into and returned from the material-box and additionally advanced on the return, and alternately ejects and stops the flow of the material, as stated.

3. The material-box with discharge nozzles or outlets at the bottom and open at top, in combination with a forcing-piston, N, having an air-vent, $d$, and valve S, substantially as and for the purpose set forth.

4. The material-box having at its bottom discharge-nozzles R and pendent stops $c$, which are longer than said nozzles, substantially as and for the purpose set forth.

5. The material-box provided with stops, and the pan-conveyer, in combination with a scrap-receiving box having a perforated lid which sustains the pan during the deposit of the material and permits scraps to fall into the box, substantially as set forth.

6. The piston in combination with the screw-shafts M, the rising and falling head L', gear-wheels $b'$, rotary shaft L, and gear-wheel $b$, substantially as and for the purpose set forth.

7. The combination, with the ratchet X and the sliding rod T, of the throw-off Y, fitted loosely on the shaft L and formed with a flange, Y', and notch $g$, substantially as and for the purpose set forth.

8. The threaded shaft L, traveler or nut U, and sliding rod T, in combination with the ratchet X and throw-off of the pawl W, substantially as and for the purpose set forth.

9. The cam G and arm H, in combination with the arms or rods K and the rising and falling head with the suspended piston, substantially as and for the purpose set forth.

10. The rising and falling table C, in combination with the shaft C', cam F, pan-carrier J, and pulleys J' J'', substantially as and for the purpose set forth.

J. HENRY MITCHELL.

Witnesses:
JOHN A. WIEDERSHEIM,
A. P. GRANT.